United States Patent
Murakami et al.

(10) Patent No.: US 6,212,044 B1
(45) Date of Patent: *Apr. 3, 2001

(54) MAGNETIC HEAD DEVICE

(75) Inventors: Yutaka Murakami; Osamu Mizuno, both of Osaka; Hisayuki Enshu, Kyoto, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,195

(22) Filed: Oct. 6, 1998

(30) Foreign Application Priority Data

Oct. 9, 1997 (JP) ................................................. 9-277727

(51) Int. Cl.[7] ............................. G11B 21/20; G11B 5/55
(52) U.S. Cl. ......................................... 360/244.9; 360/244.2
(58) Field of Search ................................... 360/103, 105, 360/104, 106, 114, 265.1, 244, 244.2, 244.4, 244.8, 244.9, 245.3, 245.7; 369/13

(56) References Cited

U.S. PATENT DOCUMENTS

| | | | |
|---|---|---|---|
| 3,349,384 | * 10/1967 | Kohn | 360/104 |
| 4,189,759 | * 2/1980 | Bauck et al. | 360/104 |
| 4,328,521 | * 5/1982 | Pexton et al. | 360/104 |
| 4,343,025 | * 8/1982 | Kronfeld et al. | 360/104 |
| 4,724,500 | * 2/1988 | Dalziel | 360/103 |
| 5,126,903 | * 6/1992 | Matsuzaki | 360/104 |
| 5,184,263 | * 2/1993 | Fukakusa et al. | 360/103 |
| 5,467,237 | * 11/1995 | Takahashi | 360/114 |
| 5,657,300 | 8/1997 | Takahashi | 369/13 |
| 5,910,867 | * 6/1999 | Takahashi | 360/106 |

FOREIGN PATENT DOCUMENTS

| | | | |
|---|---|---|---|
| 544302 | * 6/1993 | (EP) | . |
| 566998 | * 10/1993 | (EP) | . |
| 0 714 094 | 5/1996 | (EP) | . |
| 5-250750 | * 9/1993 | (JP) | . |

* cited by examiner

*Primary Examiner*—David L. Ometz
(74) *Attorney, Agent, or Firm*—Merchant & Gould P.C

(57) ABSTRACT

A magnetic head device comprises a moving member comprising a slider, which is fastened to a system for applying a magnetic field and slides on or is close to an optomagnetic disk, an elastically supporting member having a first end, to which the moving member is attached, the elastically supporting member supporting the moving member in a manner that the moving member can move, a fastening member fastened to a second end of said elastically supporting member, a position control pin, and a position control hole formed at the center of gravity of the moving member. When a shock is applied, the position control pin mates with the position control hole, so that not only the vertical position of the moving member, but also its horizontal position can be restricted. Moreover, since the position control hole is formed at the center of gravity of the moving member, a resultant moment on the moving member can be avoided. Thus, a magnetic head device with excellent shock resistance can be provided. Since it is not necessary to provide a weight extending the moving member in longitudinal direction, further miniaturization of the device can be realized.

9 Claims, 14 Drawing Sheets

MAGNETIC HEAD DEVICE

FIELD OF THE INVENTION

The present invention relates to a magnetic head device for applying a magnetic field to an information recording medium in a recording device for optomagnetic disks such as mini disks (referred to below as "MD"s) or optomagnetic data filing systems.

BACKGROUND OF THE INVENTION

In conventional optomagnetic recording/reproducing devices, an optical head device opposes one side of an optomagnetic disk, which serves as an information recording medium that is rotated by a driving mechanism. The optical head device emits a light beam for irradiating an optomagnetic recording layer of the optomagnetic disk. A magnetic head device opposes the other side of the optomagnetic disk and applies an external magnetic field to the optomagnetic recording layer.

The optomagnetic recording/reproducing device applies a magnetic field to the optomagnetic recording layer of the rotating optomagnetic disk by letting the magnetic head device modulate the direction of the magnetic field in accordance with the information signal to be recorded, while the optical head emits a light beam that is focused on the optomagnetic recording layer.

This light beam heats a portion of the optomagnetic recording layer to a temperature above the curie temperature, so that this portion loses its coercive force. After this portion has been magnetized in the direction of the magnetic field applied by the magnetic head device, the optomagnetic disk is moved by rotation relative to the light beam, so that the temperature of this portion drops below the curie temperature and the magnetization direction is fixed. Thus, an information signal is recorded in the optomagnetic recording layer.

Since there is a possibility that the optomagnetic disk sways during the rotation, recent optomagnetic recording/reproducing devices comprise sliding magnetic head devices. A sliding magnetic head device records the information signal while sliding on the MD. Such a conventional magnetic head device is disclosed, for example, in Publication of Unexamined Japanese Patent Application No. Hei 8-147914.

The following is a more detailed explanation of a conventional magnetic head device, with reference to FIGS. 9–14. FIG. 9 is a perspective view of an example of a conventional magnetic head device. FIG. 10 is a perspective view of the magnetic head device shown in FIG. 9, taken from the other side. The elastic members 2 are punched from an electrically conductive thin metal sheet of, for example, phosphor bronze or BeCu. The fastening member 3, illustrated in FIGS. 9 and 10, connects the magnetic head device 1 to an optical head device 91 (illustrated in FIG. 13). The fastening member 3 is molded in one piece using a synthetic resin. A slider 5 is molded in one piece from synthetic resin and attached to the front end portion of the pair of elastic members 2. A head-supporting member 6 is molded around the pair of elastic members 2 in one piece using synthetic resin.

FIG. 12 is a side elevation of a system for applying a magnetic field, which is arranged in the slider 5 of FIGS. 9 to 11. A magnetic pole core 32 is E-shaped and formed from magnetic material such as a ferrite. A coil 4 is wound around the central magnetic pole 32a of the magnetic pole core 32. The coil 4 and the magnetic pole core 32 apply a magnetic field, and are fixed to the slider 5. A sliding portion 52 protrudes more towards the optomagnetic disk than the central magnetic pole 32a of the magnetic pole core 32, and slides on the optomagnetic disk.

The sliding portion 52 protrudes from the front end side of the slider 5 opposing the base end side of the elastic members 2. The slider 5 has a second elastically deformable portion 8 of the elastic members 2 in its center. As will be explained further below, when the slider 5 and the head-supporting member 6 are rotated away from the optomagnetic disk 100, the slider 5 abuts a rotation orientation control arm 84. A contacting portion 53 is formed on the front end side of the slider 5 and controls the rotational orientation of the slider 5 relative to the head-supporting member 6. When the slider 5 abuts the rotation orientation control arm 84, it rotates around the second elastically deformable portion 8.

The portion of the pair of elastic members 2 between the fastening member 3 and the head-supporting member 6 is a first elastically deformable portion 7. There is no synthetic resin molded around the first elastically deformable portion 7, so that the elastic members 2 in this portion are exposed. The first elastically deformable portion 7 is the rotation center when the head-supporting member 6 and the slider 5 are rotated forward or away from the optomagnetic disk 100.

Moreover, the portion of the elastic members 2 between the slider 5 and the head-supporting member 6 is the second elastically deformable portion 8. There is no synthetic resin molded around the second elastically deformable portion 8, so that the elastic members 2 in this portion are exposed. The system for applying a magnetic field is attached to the slider 5. The slider 5 follows the swaying of the rotating optomagnetic disk 100, so that the second elastically deformable portion 8 moves elastically back and forth.

The resilience of the first elastically deformable portion 7 and the second elastically deformable portion 8 forces the slider 5 against the optomagnetic disk 100. Thus, the slider 5 slides on the rotating optomagnetic disk 100 with a certain sliding pressure. For the resilient force, a force is sufficient if it causes the slider 5 to glide on the optomagnetic disk 100 with a certain sliding pressure and without separating too much from the surface of the optomagnetic disk 100. When the resilient force is too large, the sliding friction between the slider 5 and the optomagnetic disk 100 increases, and may result in considerable wear of the slider 5 and the optomagnetic disk 100.

Therefore, the resilience and the mechanical strength of the first and the second elastically deformable portions 7 and 8 should be restricted to relative small values. For this reason, the first and the second elastically deformable portions 7 and 8 are formed as plate springs of thin phosphor bronze, for example.

In such a magnetic head device, however, the cantilevered head-supporting member 6 is formed of a thin plate spring with insufficient mechanic strength. Thus, when a shock is applied to the magnetic head device, the load on the cantilevered head-supporting member 6 can easily surpass the elastic limit, so that the head-supporting member 6 is deformed. Especially, when a shock is applied to the head-supporting member 6, the load concentrates on the base end, and the first elastically deformable portion 7 may deform considerably.

This danger of easy deformation as a result of a shock is the same even when the magnetic head device is built into an optomagnetic recording/reproducing device. In this case, if a shock is applied to the optomagnetic recording/reproducing device, the shock is transmitted to the magnetic head device, and the first elastically deformable portion 7 may be deformed easily.

To withstand such shocks, the head-supporting member 6 is provided with a connecting arm 76, as shown in FIGS. 9–11, 13 and 14. This connecting arm 76 is provided at one side of the base end of the head-supporting member 6 near the fastening member 3 and extends in the longitudinal direction of the head-supporting member 6. The connecting arm 76 is provided with a weight 77 on its end.

The weight 77 relocates the center of gravity of the head-supporting member 6, which is supported by the fastening member 3 via the first elastically deformable portion 7, to a spot nearer the first elastically deformable portion 7. In other words, the connection arm 76 extends the head-supporting member 6 beyond the first elastically deformable portion 7 and comprises a weight 77 on its end. The weight 77 is provided on the side of the fastening member 3, with respect to the first elastically deformable portion 7.

A rotation orientation control arm 84 is provided on the end of the side opposite from the connection arm 76, as indicated in FIGS. 9–11, 13, and 14. The rotation orientation control arm 84 is substantially parallel to the head-supporting member 6. The rotation orientation control arm 84 comprises on its end a rotation orientation control portion 85 bent in L-shape, as shown in FIGS. 9 and 10. This rotation orientation control portion 85 opposes the top of the contacting portion 53 protruding at one end of the slider 5.

When the head-supporting member 6 rotates in arrow direction A in FIG. 9 with the first elastically deformable portion 7 at the rotation center, or in other words, when the slider 5 pivoted on the tip of the head-supporting member 6 is rotated away from the sliding surface of the optomagnetic disk 100, the rotation orientation control arm 84 controls the rotational orientation of the slider 5, which rotates around the second elastically deformable portion 8, by abutting the contacting portion 53 with the rotation orientation control portion 85.

Moreover, the fastening member 3 provided at the base end of the pair of elastic members 2 supports the magnetic head device 1 and fixes it to a pedestal 101. The pedestal 101 is movable in such a direction that the slider 5 moves in a radial direction across the optomagnetic disk 100. The pedestal 101 is rigidly connected to the optical head device 91. As is shown in FIG. 10, a hole 79 for inserting a fixing member such as a screw is drilled into the center of the pedestal 101. Moreover, a dowel hole 80 and an dowel concavity 81, which engage with a pair of positioning pins, are drilled into the bottom surface of the fastening member 3. The positioning pins (not shown in the drawings) protrude from the pedestal.

A magnetic head device 1 as described above is connected to a carriage 92, which is arranged movably inside the optomagnetic recording/reproducing device. As shown in FIG. 13, the optical head device 91 is attached to the carriage 92. Thus, the magnetic head device 1 moves in synchronization with the optical head device 91.

A driving mechanism for rotating the disk is attached to a chassis board 93. Also attached to the chassis board 93 is a slide guide axis 94. A through hole 95 for accepting the slide guide axis 94 is drilled into a middle portion of the carriage 92. A pair of upper and lower guide beads 96 and 97 protrude from one end of the carriage 92. The upper and lower guide beads 96 and 97 guide the carriage 92 along a slide guide portion 98 provided on one side of the chassis board 93. Thus, the carriage 92 is supported movably in radial direction of the optomagnetic disk 100, which is contained by a disk cartridge 99, installed inside the optomagnetic recording/reproducing device. The carriage 92 can be moved by a head-feed mechanism that is driven by a motor (not shown in the drawing).

The optical head device 91 is attached to a front end portion of the carriage 92. The objective lens of the optical head device 91 opposes the optomagnetic disk 100 and focuses a light beam emitted from a light source onto the signal recording layer of the optomagnetic disk 100. The optical head device 91 is attached to the carriage 92 in a manner that the optical axis of the objective lens intersects with a line through the center of the optomagnetic disk 100.

The pedestal 101, to which the magnetic head device 1 is attached, is formed on the side of the carriage 92 that is opposite from the side to which the optical head device 91 is attached. The pedestal 101 rises along one side of the disk cartridge 99, which is installed in a cartridge carrying member inside the optomagnetic recording/reproducing device, as illustrated in FIG. 13.

As shown in FIG. 13, the magnetic head device 1 is connected to the carriage 92 by fixing the fastening member 3 to the upper end portion of the pedestal 101, so that the head-supporting member 6 extends over the disk cartridge 99. The magnetic head device 1 is attached to the pedestal 101 by engaging the dowel hole 80 and the dowel concavity 81 provided at the bottom surface of the fastening member 3 with the positioning pins protruding from the upper surface of the pedestal 101 to position the fastening member 3 on the pedestal 101. Then, the fastening member 3 is attached to the pedestal 101 with a screw that is inserted and screwed into the hole 79 to thus insert a fixing member.

The slider 5 is supported by the second elastically deformable portion 8 on the front end of the head-supporting member 6. The central magnetic pole 32a of the magnetic pole core 32 is a part of a system for applying a magnetic field, which is attached to the slider 5. When the magnetic head device 1 is fastened onto the pedestal 101, the central magnetic pole 32a opposes the objective lens of the optical head device 91. The optomagnetic disk 100 is arranged between the central magnetic pole 32a and the objective lens. Thus, an external magnetic field can be applied where a light beam irradiates the optomagnetic disk 100.

The carriage 92 is driven by a head-feeding mechanism. The magnetic head device 1 is moved in the radial direction of the optomagnetic disk 100 (arrow directions B and C in FIG. 14) together with the optical head device 91. The direction in which the magnetic head device 1 moves with respect to the optomagnetic disk 100 is perpendicular to the longitudinal direction of the head-supporting member 6, as indicated in FIG. 14.

However, in conventional magnetic head devices as described above, the weight 77 extends in the longitudinal direction of the magnetic head device 1, so that the magnetic head becomes longer in the longitudinal direction. This stands in the way of miniaturization of the optomagnetic recording/reproducing device.

It is a purpose of the present invention to solve these problems of the prior art and provide a magnetic head device with excellent shock resistance and suitable for miniaturization by substantially aligning the position of a position control member with the center of gravity of a moving member.

SUMMARY OF THE INVENTION

In order to attain the above goals, a magnetic head device in accordance with the present invention comprises a system for applying a magnetic field to an information recording medium; a moving member comprising a slider, which is fastened to the system for applying a magnetic field and slides on or is close to the information recording medium; an elastically supporting member having a first end, to which the moving member is attached, the elastically supporting member supporting the moving member in a manner that the moving member can move; a fastening member fastened to a second end of the elastically supporting member; and a position control member for restricting a moving range of the moving member; wherein at least with respect to a direction from the fastening member towards the slider, a position of the position control member substantially matches the center of gravity of the moving member.

When a shock is exerted on such a magnetic head device, a moment working on the magnetic head device can be prevented, and a magnetic head device with excellent shock resistance can be obtained. And since it is not necessary to provide a weight extending the moving member in the longitudinal direction, further miniaturization of the device can be realized.

A preferable embodiment of the magnetic head device further comprises a protective member having a first end and a second end. The first end is fastened to the fastening member, and the second end extends on the side of the slider. The position control member is formed of the protective member and the moving member.

In a preferable embodiment of the present invention, the position control member is formed of (a) a hole or concavity formed at the center of gravity of the moving member and (b) a position control pin formed in the protective member. The position control pin is inserted into the hole or concavity when the moving member moves towards the protective member. When a shock is applied to such a magnetic head device, the position control pin is inserted into the position control hole, so that the displacement of the moving member is restricted not only in the vertical direction, but also in the horizontal direction. In addition, exertion of a moment on the moving member can be prevented, because the position control hole is provided at the center of gravity of the moving member. Thus, a magnetic head device with excellent shock resistance can be provided.

In a preferable embodiment of the present invention, the slider, the fastening member, the protective member, and the position control member are formed of plastic. The elastically supporting member is formed of metal. The slider, the fastening member, the protective member, the position control member and the elastically supporting member are formed in one piece by insert molding.

It is preferable that the protective member comprises a rotating joint for rotating the protective member with respect to the fastening member, and a positioning portion for positioning the protective member with respect to the fastening member. The protective portion is fastened to the fastening member with the positioning portion after the insert molding.

In such a magnetic head device, the protective member can be positioned with increased precision, because it comprises a positioning portion. The fixing of the rotating joint of the protective member can be performed simultaneously with the insert molding step, so that it is possible to reduce the number of manhours.

In an even more preferable magnetic head device, the protective member is fastened to the fastening member with the positioning portion by rotating the protective member around the rotating joint.

It is preferable that the protective member is fastened to the fastening member with the positioning portion by inserting a pin into a hole or a concavity. It is also preferable that the protective member is fastened to the fastening member by gluing.

It is preferable that the protective member is fastened to the fastening member by heat fusing, because fusion allows very precise fastening of the protective member.

It is even more preferable that the protective member is fastened to the fastening member by heat fusing using a fusion pin that is separate from the positioning portion. This increases the accuracy and the reliability for fastening of the protective member. Moreover, since a positioning pin and a fusion pin are provided separately, deformation of the positioning pin due to fusion can be avoided, and the protective member can be affixed to the fastening member with great precision.

DESCRIPTION OF THE PREFERRED EMBODIMENTS

The following is a description of embodiments of the present invention with reference to the accompanying drawings.

First Embodiment

Figure 1:
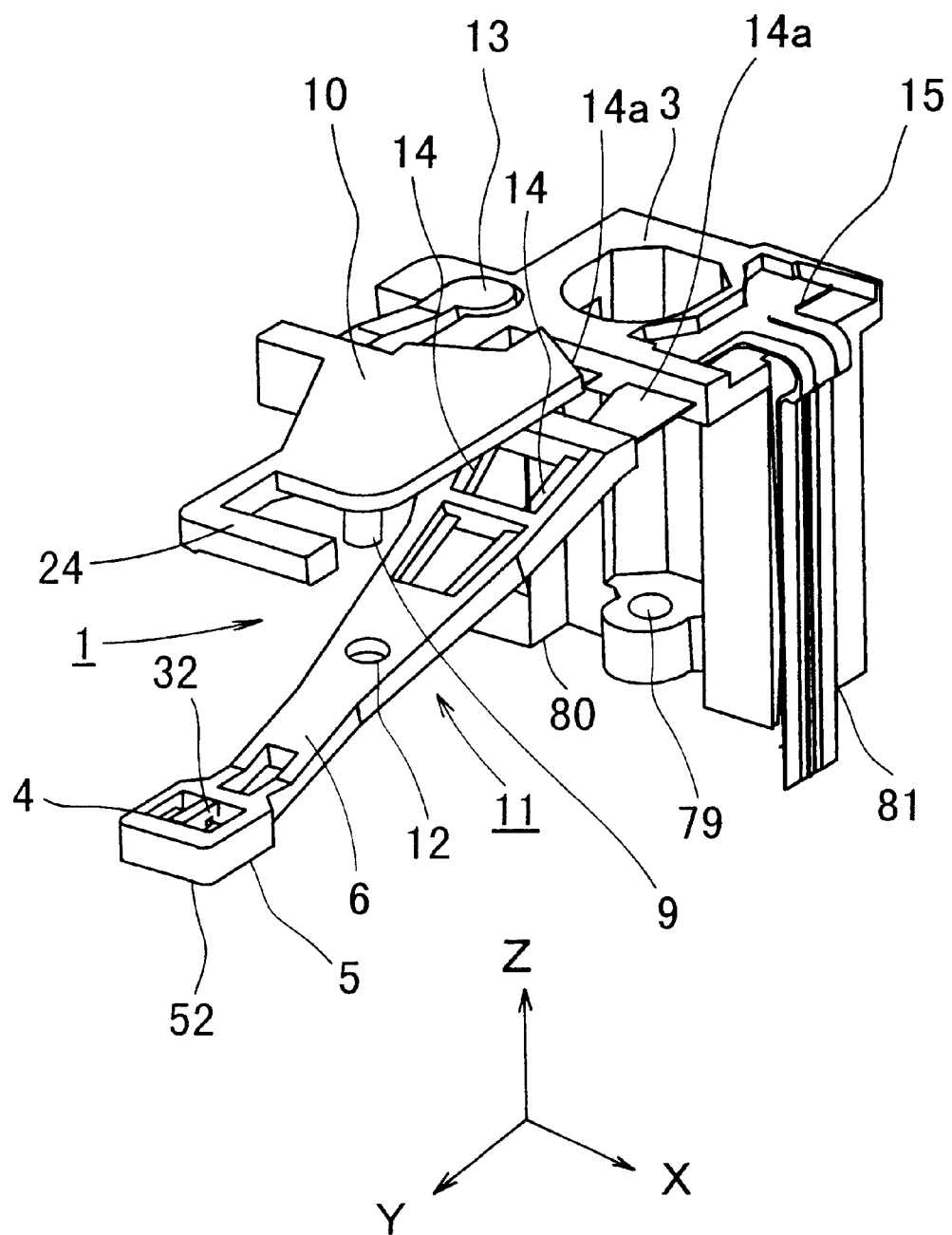
FIG. 1 is a perspective view of a magnetic head device according to a first embodiment of the present invention.

FIG. 1 is a perspective view of a magnetic head device according to a first embodiment of the present invention.

Figure 2:
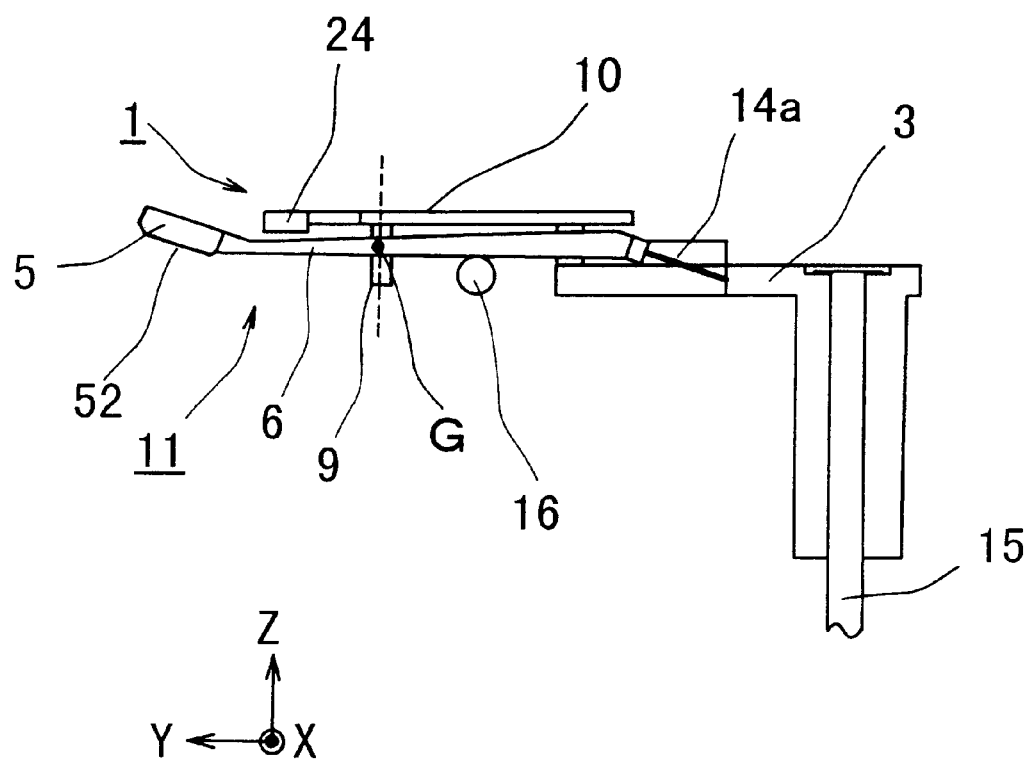
FIG. 2 is a side elevation of the magnetic head device according to a first embodiment of the present invention, when the magnetic head device is separated from the optomagnetic disk.
Figure 3:
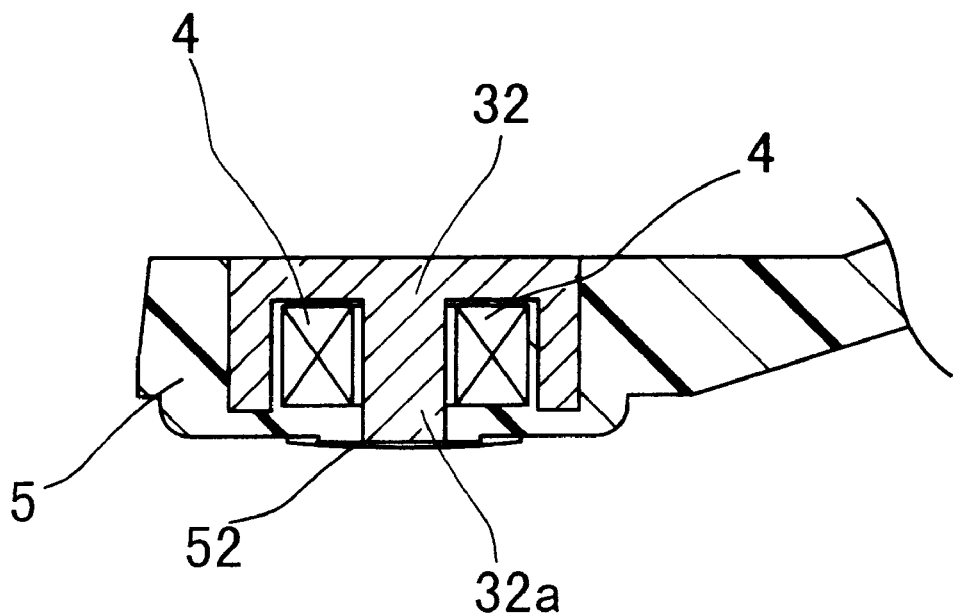
FIG. 3 is a side elevation showing the elements of a system for applying a magnetic field in the magnetic head device according to a first embodiment of the present invention.
Figure 3:
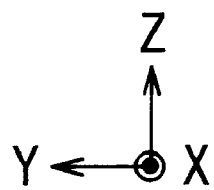
Figure 4:
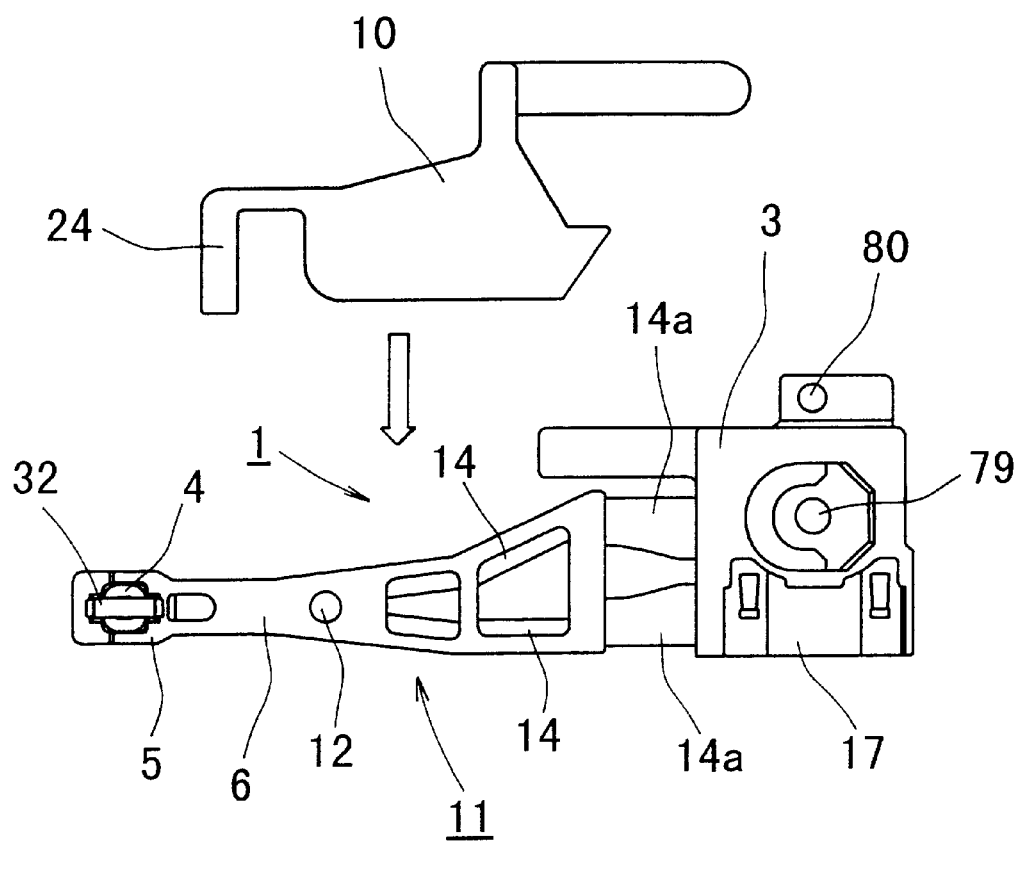
FIG. 4 is a top view illustrating the assembly of the magnetic head device according to a first embodiment of the present invention.
Figure 5:
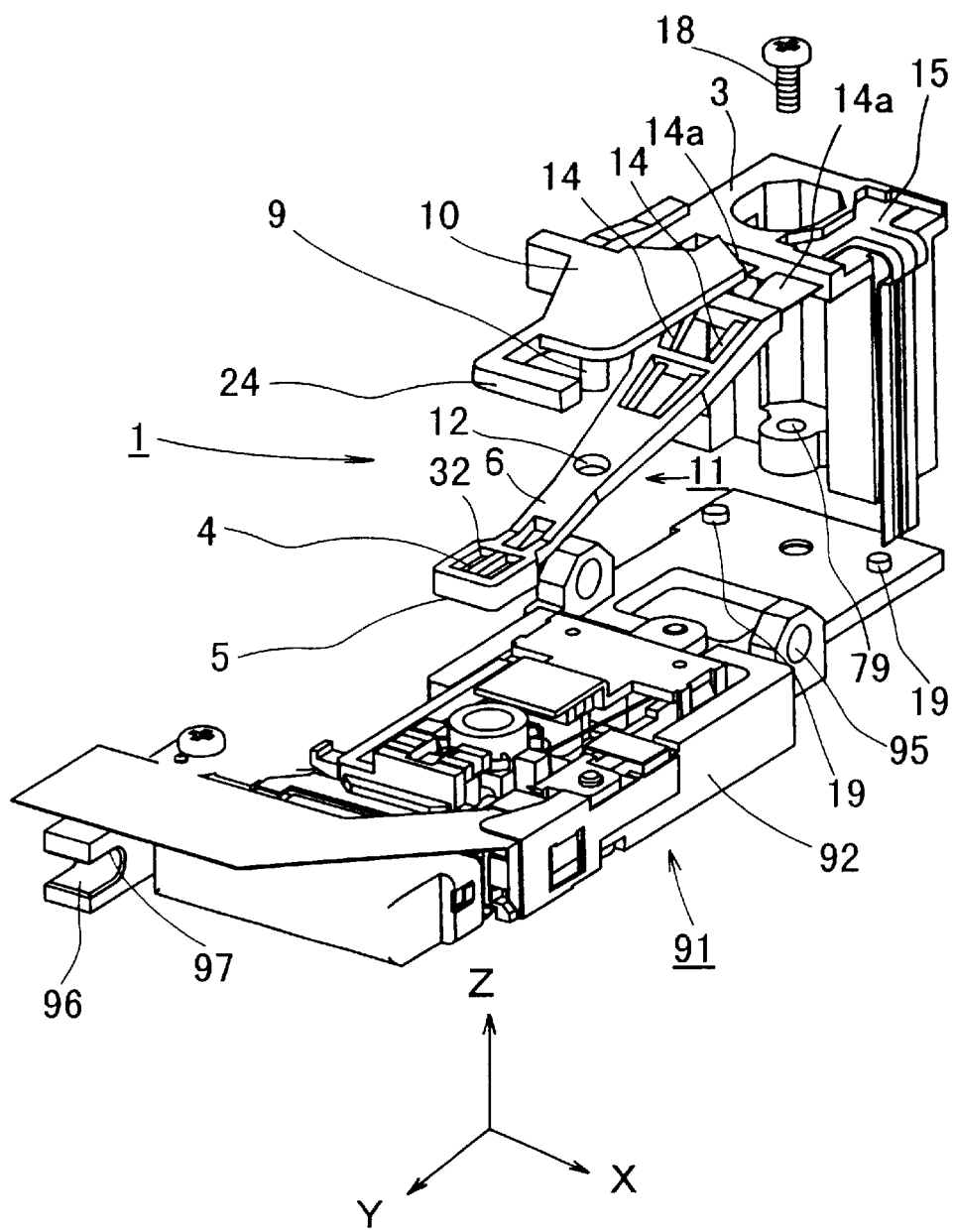
FIG. 5 is a perspective view of a magnetic head device and an optical head according to a first embodiment of the present invention.

FIG. 2 is a side elevation of the magnetic head device when it is separated from the optomagnetic disk. FIG. 3 is a side elevation showing the elements of a system for applying a magnetic field. FIG. 4 is a top view illustrating the assembly of the magnetic head device. FIG. 5 is a perspective view of the magnetic head device and an optical head.

Parts that correspond to parts of a conventional magnetic head device as illustrated in FIGS. 9–14 have been given the same number, and are not further explained below. A pair of elastically supporting members 14, as shown in FIGS. 1–5, are punched from an electrically conductive thin metal sheet of, for example, phosphor bronze or BeCu. The fastening member 3, which is illustrated in FIGS. 1 and 5, is formed in one piece by molding a synthetic resin on a base end of the pair of elastically supporting members 14. The fastening member 3 attaches the magnetic head device 1 to an optical head device 91.

A slider 5 and a head-supporting member 6 are molded in one piece from synthetic resin on the front end of the elastically supporting members 14. As is shown in FIG. 3, a magnetic pole core 32 is E-shaped and formed from magnetic material such as ferrite. A coil 4 is wound around a central magnetic pole 32a of the magnetic pole core 32. The coil 4 and the magnetic pole core 32 form a system for applying a magnetic field, and are fixed to the slider 5. A sliding portion 52 protrudes more than the central magnetic pole 32a of the magnetic pole core 32 towards the optomagnetic disk 100. The sliding portion 52 slides on the optomagnetic disk 100.

The portion of the pair of elastically supporting members 14 between the fastening member 3 and the head-supporting member 6, as shown for example in FIG. 1, is an elastically deformable portion 14a. There is no synthetic resin molded around this elastically deformable portion 14a, so that the elastically supporting members 14 in this portion are exposed. The elastically deformable portion 14a is the rotation center when the head-supporting member 6 and the slider 5 are rotated forward or away from the optomagnetic disk 100. The slider 5, to which the system for applying a magnetic field is attached, follows the swaying of the rotating optomagnetic disk 100, so that the elastically deformable portion 14a moves elastically back and forth.

The elastically deformable portion 14a applies a resilient force onto the slider 5. Thus, the slider 5 slides on the rotating optomagnetic disk 100 with a certain sliding pressure. A resilient force is sufficient if it causes the slider 5 to glide on the optomagnetic disk 100 with a certain sliding pressure and without separating too much from the principal surface of the optomagnetic 100. When the resilient force is too large, the sliding friction between the slider 5 and the optomagnetic disk 100 becomes large, and may result in considerable wear of the slider 5 and the optomagnetic disk 100. Therefore, the elastically deformable portion 14a should be formed as plate springs of thin phosphor bronze, for example, and its resilience and mechanical strength should be restricted to small values.

A protective member 10 is attached to the magnetic head device of the present embodiment, as shown in FIG. 1. If no protective member 10 is attached to the magnetic head device and a shock is applied to the device, the load on the cantilevered head-supporting member 6, which contains a thin plate spring with only little elastic and mechanic strength, can easily surpass the elastic limit, so that the head-supporting member 6 is deformed. Especially, when a shock is applied to the head-supporting member 6, the load easily concentrates on the base end, and the elastically deformable portion 14a may deform considerably, because it has only little elastic and mechanical strength.

This danger of easy deformation as a result of a shock is the same even when the magnetic head device is built into an optomagnetic recording/reproducing device. In this case, if a shock is applied to the optomagnetic recording/reproducing device, the shock is transmitted to the magnetic head device, and the elastically deformable portion 14a may easily be deformed.

In order to achieve a shock-resistant structure, a protective member 10 is attached to the magnetic head device of the present embodiment. As shown in FIGS. 1, 2 and 4, the protective member 10 is attached to one side of the fastening member 3 and covers the upper surface of the head-supporting member 6. As can be seen in FIG. 4, the protective member 10 is a separate plastic part that is glued to the fastening member 3.

The front end portion of the protective member 10 is an L-shaped upper position control portion 24, which restricts the upper position of the head-supporting member 6. A position control member includes a position control pin 9 and a position control hole 12. The position control pin 9 is provided at the bottom surface of the protective member 10. The position control hole 12 is arranged at the center of gravity G (see FIG. 2) of a moving member 11 comprising the head-supporting member 6 arranged at the front end of the elastically deformable portion 14a, the slider 5, the magnetic pole core 32, and the coil 4, and can mate with the position control pin 9.

When the moving member 11 is rotated by a lifting member 16 (see FIG. 2) in the Z-direction with the elastically deformable portion 14a at the rotation center, the moving member 11 approaches the upper position control portion 24 and the position control pin 9 mates with the position control hole 12. When the thus-positioned magnetic head device 1 receives a shock in the Z-direction, i.e. the moving direction, the upper position control portion 24 abuts the head-supporting member 6, so that the displacement of the head-supporting member 6 in the Z-direction is restricted.

When the magnetic head device 1 receives a shock in the X-direction or the Y-direction, i.e. in a direction perpendicular to the moving direction, the position control pin 9 abuts the position control hole 12, so that the displacement of the head-supporting member 6 in the X-direction and in the Y-direction is restricted. Since the position control pin 9 is positioned at the center of gravity G of the moving member 11, a resultant moment on the moving member 11 can be suppressed.

As is illustrated in FIG. 5, the magnetic head device 1 is supported by the fastening member 3 to the carriage 92, which is movable in the radial direction (X-direction) of the optomagnetic disk 100, and therefore moves in synchronization with the optical head device 91.

A fixing member insertion hole 79 for inserting a screw 18 that is fastened to the carriage 92 is drilled into a center portion of the fastening member 3. A pair of dowel pins 19, serving as positioning pins, protrude from the upper surface of the carriage 92. These dowel pins 19 mate with a dowel hole 80 (see FIG. 4) and an dowel concavity 81 (see FIG. 6), which are drilled into the bottom surface of the fastening member 3. The configuration of the carriage 92 to which the magnetic head device 1 and the optical head device 91 are connected is the same as in the prior art, so that a detailed explanation has been omitted.

The optical head device 91 comprises an objective lens for focusing a light beam emitted from a light source onto a signal recording layer of the optomagnetic disk 100. This objective lens is arranged in opposition to the optomagnetic disk 100. The optical head device 91 is attached to the carriage 92 in a manner that the optical axis of the objective lens intersects with a line through the center of the optomagnetic disk 100.

When the magnetic head device 1 is connected with the top of the carriage 92, the central magnetic pole 32a (see FIG. 3) of the magnetic pole core 32, which is part of the system for applying a magnetic field attached to the slider 5 formed at the front end of the head-supporting member 6, opposes the objective lens of the optical head device 91. The optomagnetic disk 100 is arranged between the central magnetic pole 32a and the objective lens. Thus, an external magnetic field can be applied where a light beam irradiates the optomagnetic disk 100.

As has been explained above, when a shock is exerted on the magnetic head device according to this first embodiment of the present invention, not only a displacement in the moving direction of the moving member, but also in a perpendicular direction thereto can be restricted, because the position control pin is inserted in the position control hole. And because the position control hole is arranged at the center of gravity of the moving member, a resultant moment on the moving member can be suppressed, so that a magnetic head device with excellent shock resistance can be obtained. Moreover, it is not necessary to provide a weight that extends in the longitudinal direction of the moving member as in the prior art, so that a further miniaturization of the device can be realized.

Second Embodiment

Figure 6:
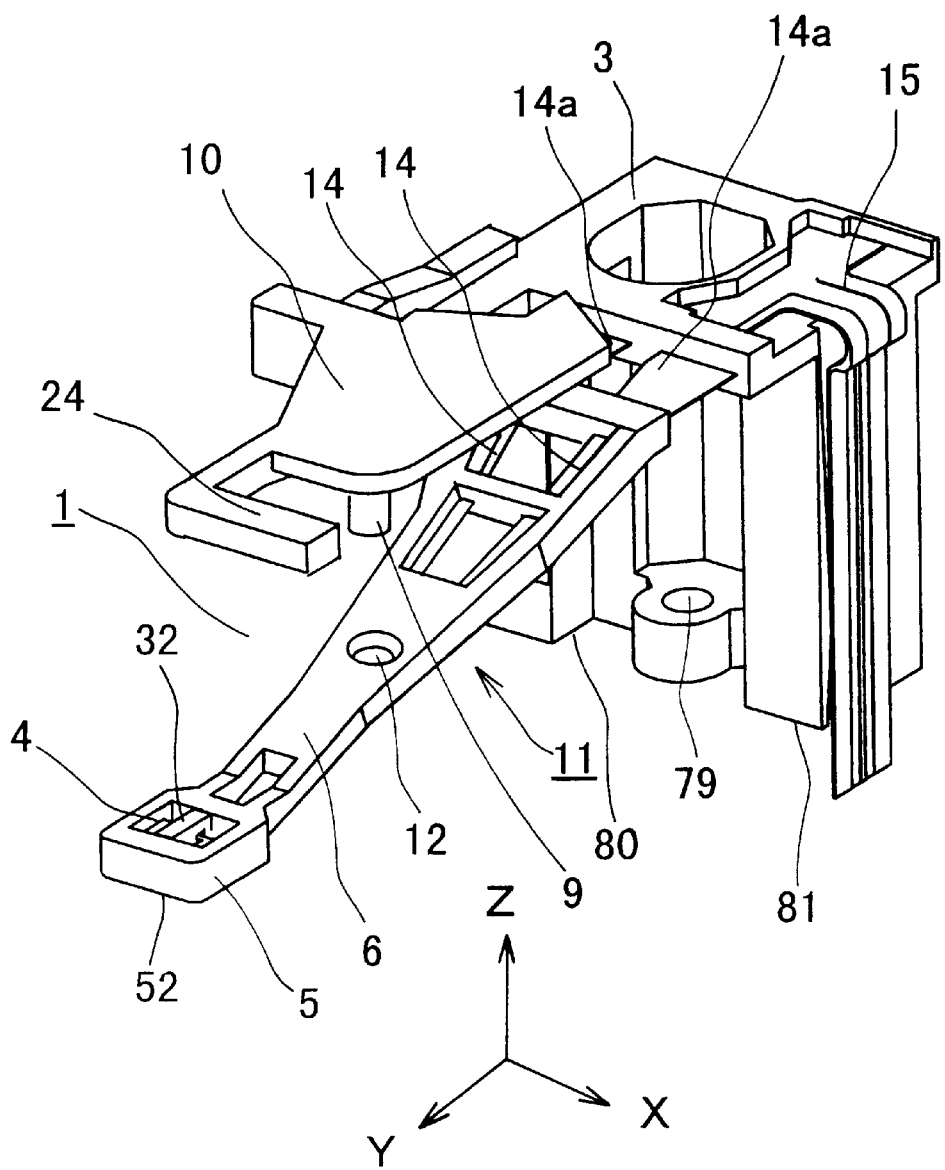
FIG. 6 is a perspective view of the magnetic head device according to a second embodiment of the present invention.
Figure 7:
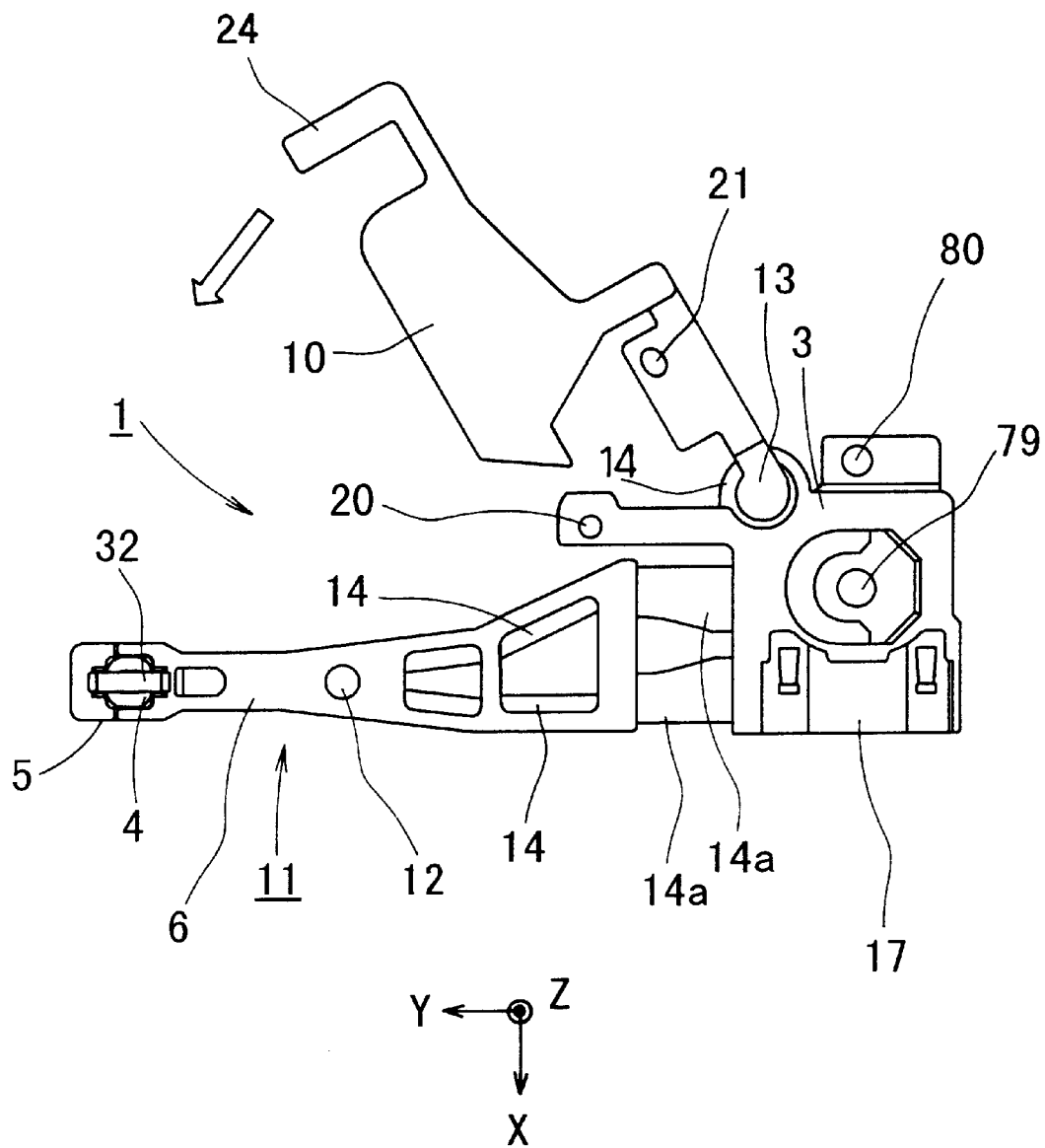
FIG. 7 is a top view illustrating the assembly of the magnetic head device according to the second embodiment of the present invention.

The following is an explanation of the second embodiment of the present invention with reference to FIGS. 6 and 7. FIG. 6 is a perspective view of the magnetic head device according to a second embodiment of the present invention. FIG. 7 is a top view illustrating the assembly of the magnetic head device according to the second embodiment.

The magnetic head device according to the second embodiment of the present invention differs from a magnetic head device according to the first embodiment of the present invention in that the protective member 10 comprises a rotating joint 13, and the protective member 10 and the fastening member 3 are formed in one piece.

As is shown in FIG. 7, the protective member 10 is formed in one piece with the elastically supporting members 14, which extend from the fastening member 3 and are exposed, while a certain angle is defined between the protective member 10 and the head-supporting member 6 in the XY-plane so that the two do not overlap. The reason for this is that mold-release is impossible because of the resulting undercut when the protective member 10 and the head-supporting member 6 do not form a certain angle in the XY-plane but overlap.

After the molding, the protective member 10 is turned in the XY-plane around the rotating joint 13, a positioning pin 20 formed on the moving member side of the fastening member is inserted into a positioning hole 21 formed in the protective member 10, and the protective member is attached by gluing. The rotating joint 13 is formed by a portion of the elastically supporting members 14 made of a thin plate, so that it displays some elasticity, and the protective member 10 can be raised in the Z-direction to insert the positioning pin 20.

In addition to the positive effects of the first embodiment of the present invention, the positioning precision of the protective member 10 in the magnetic head device according to the second embodiment of the present invention can be improved, because the protective member 10 comprises a positioning portion. And the fixing of the rotating joint 13 of the protective member 10 can be performed simultaneously with an insert molding step, so that it is possible to reduce the number of manhours.

Third Embodiment

Figure 8:
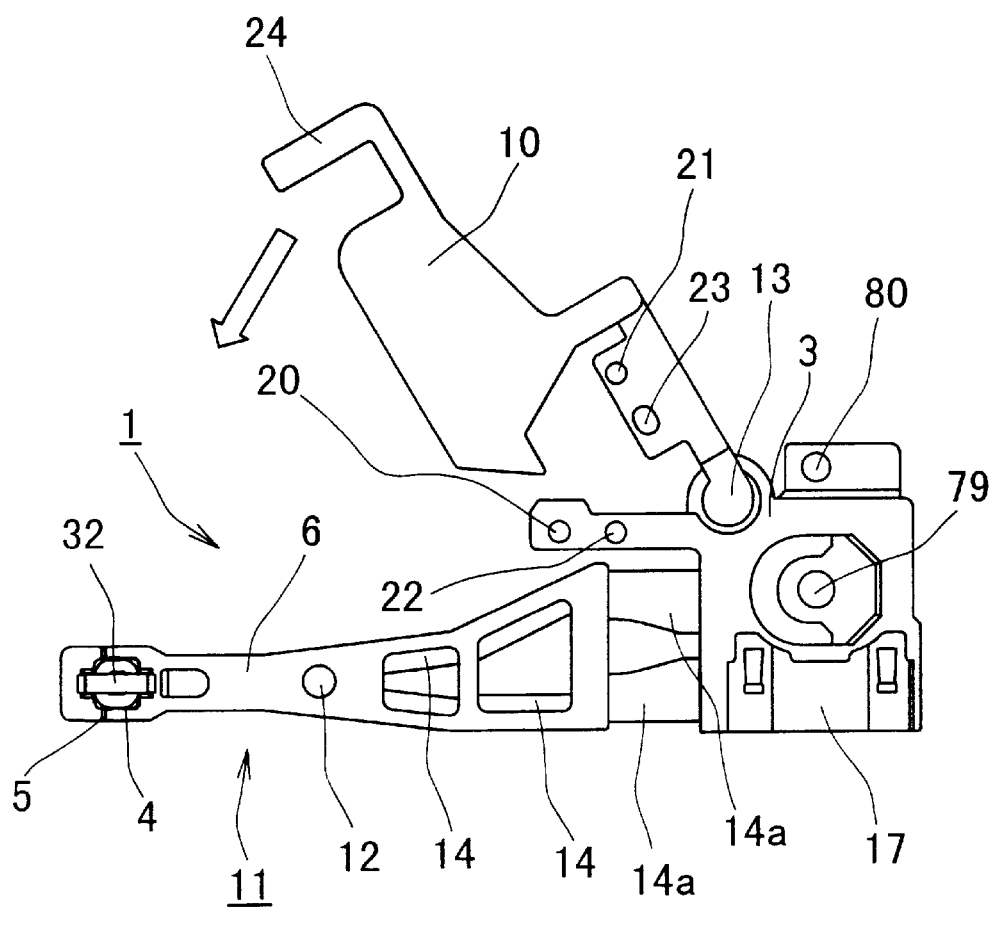
FIG. 8 is a top view illustrating the assembly of the magnetic head device according to a third embodiment of the present invention.
Figure 9:
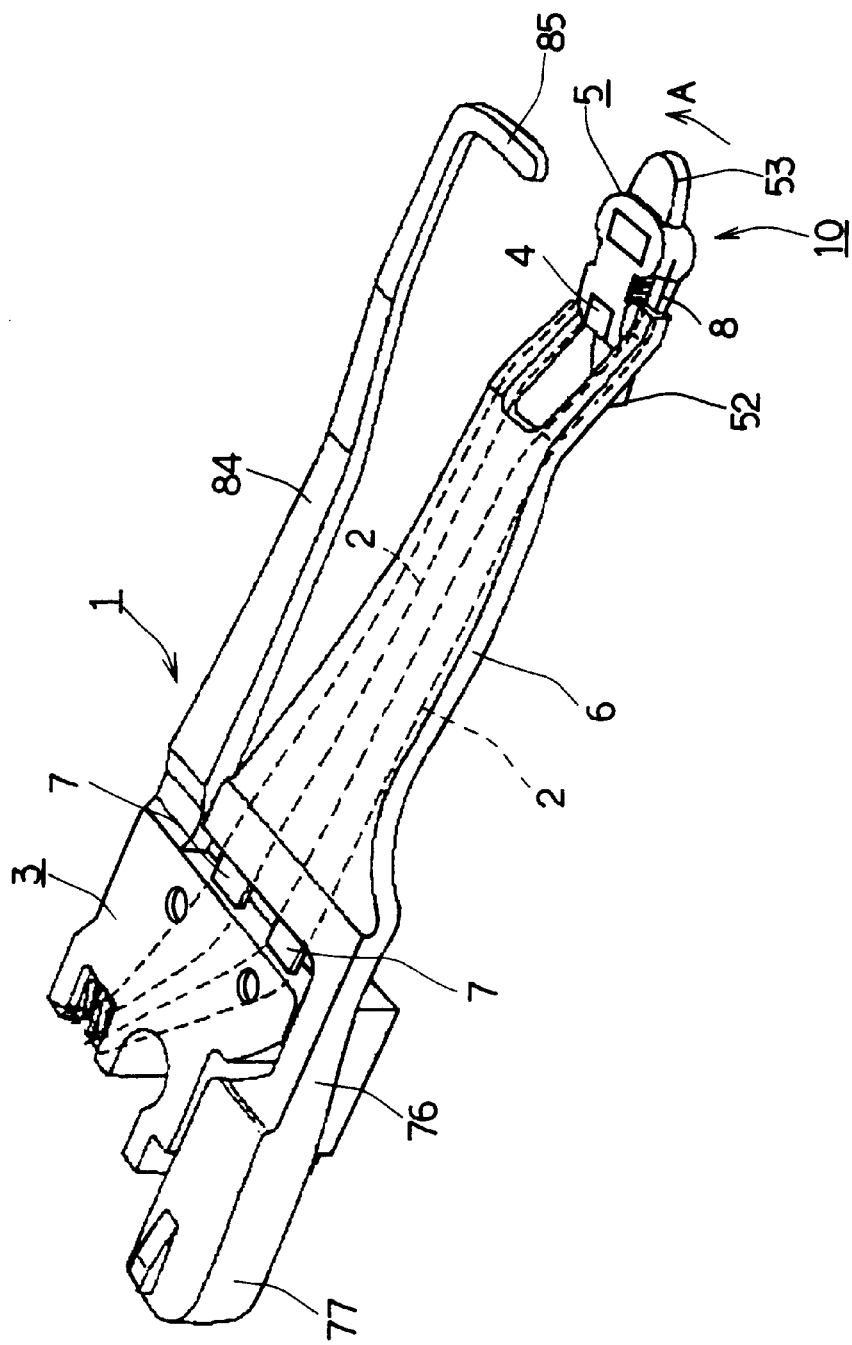
FIG. 9 is a perspective view of a conventional magnetic head device.
Figure 10:
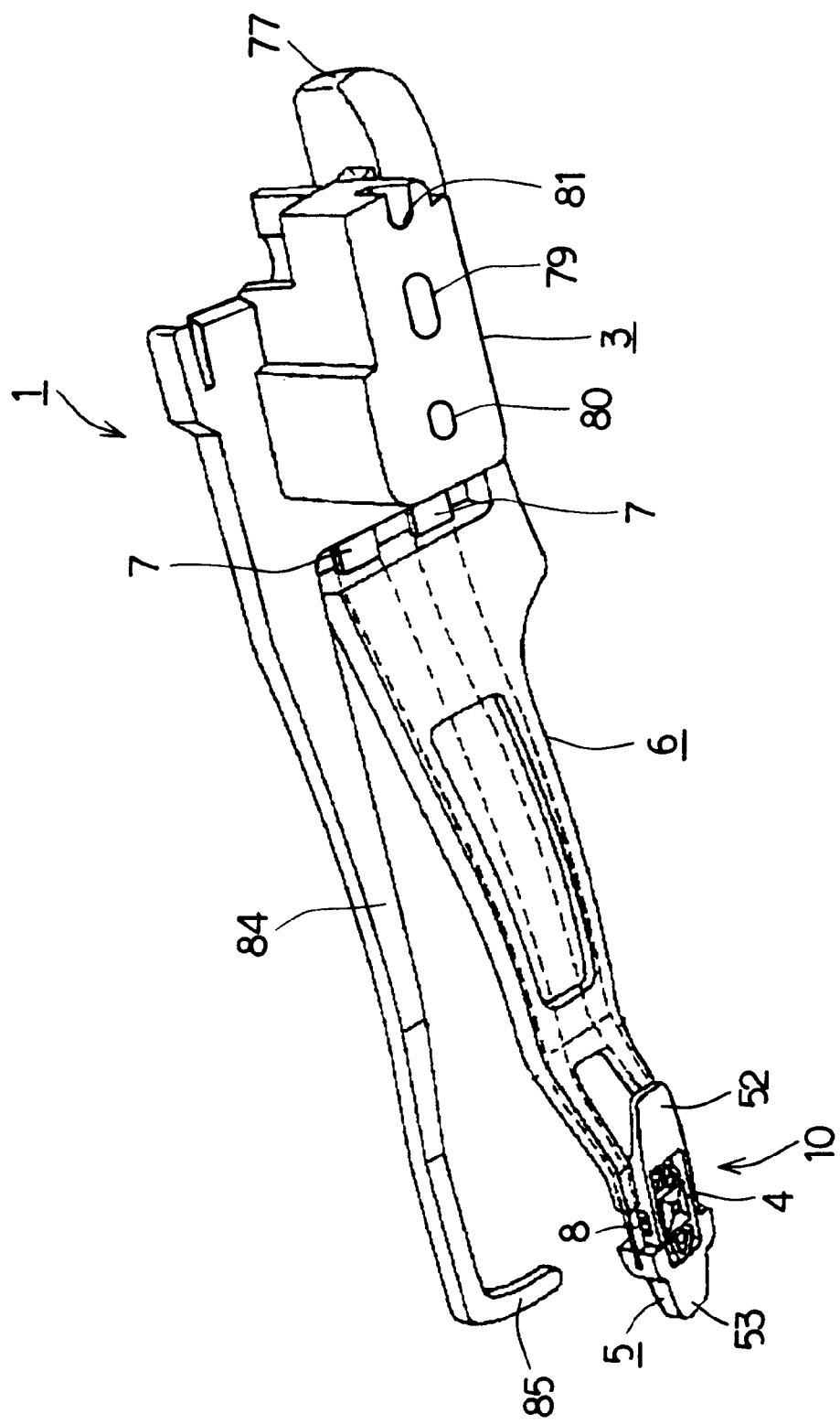
FIG. 10 is a perspective view of the conventional magnetic head device in FIG. 9, taken from the other side.
Figure 11:
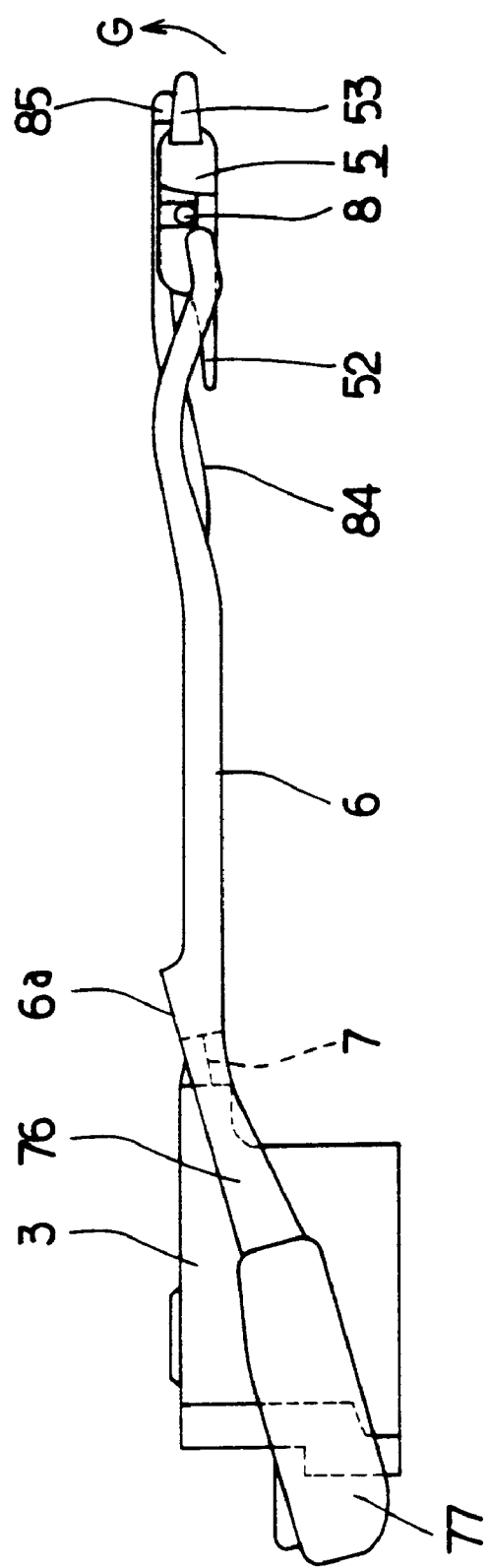
FIG. 11 is a side elevation of an example of the conventional magnetic head device.
Figure 12:
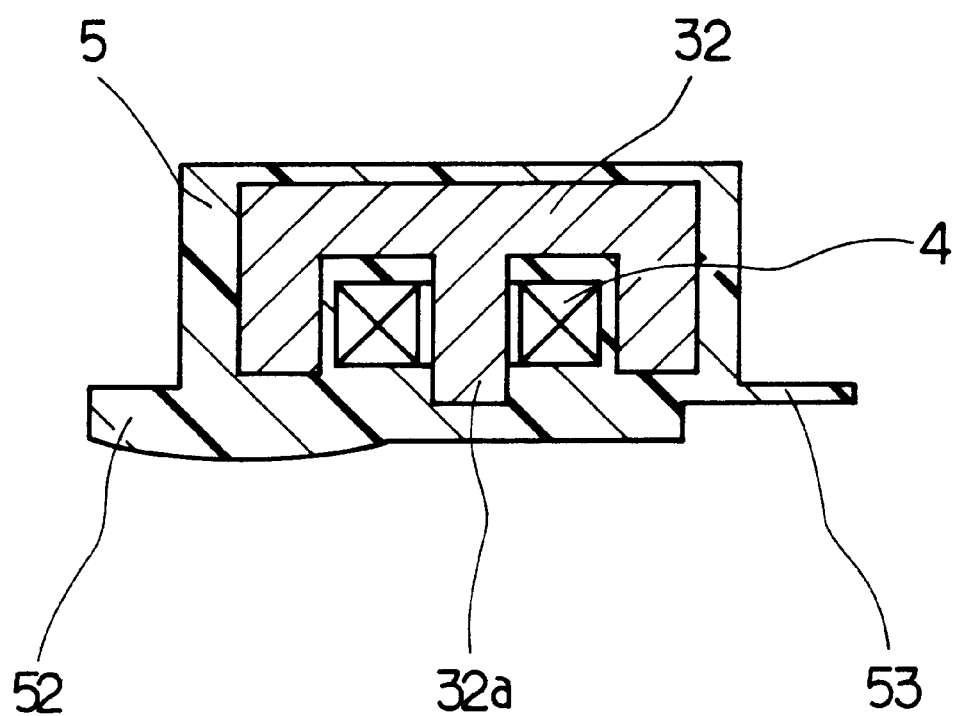
FIG. 12 is a side elevation of a system for applying a magnetic field in a conventional magnetic head device.
Figure 13:
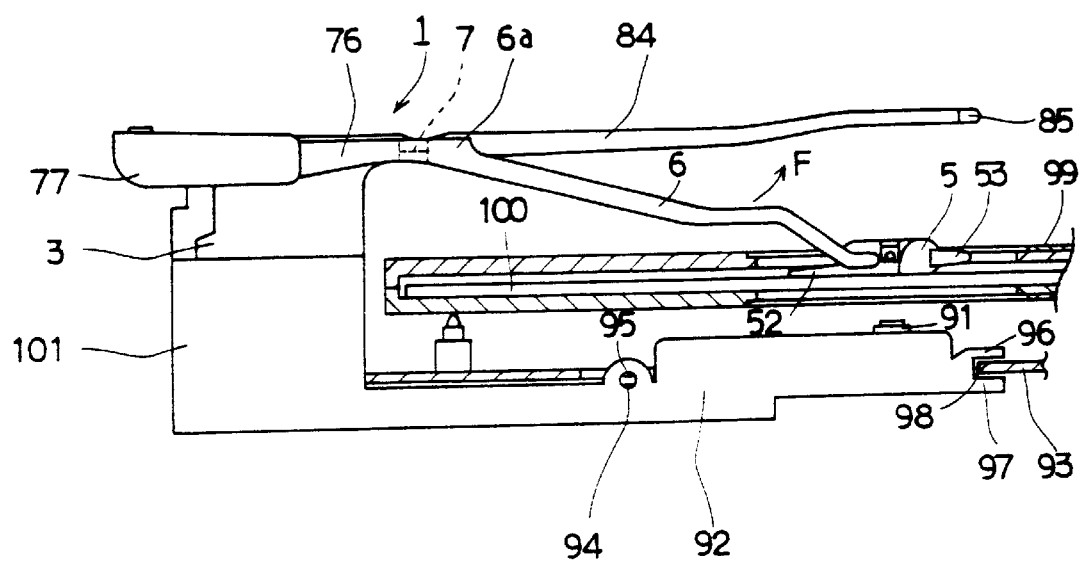
FIG. 13 is a side elevation of a conventional optomagnetic recording/reproducing device.
Figure 14:
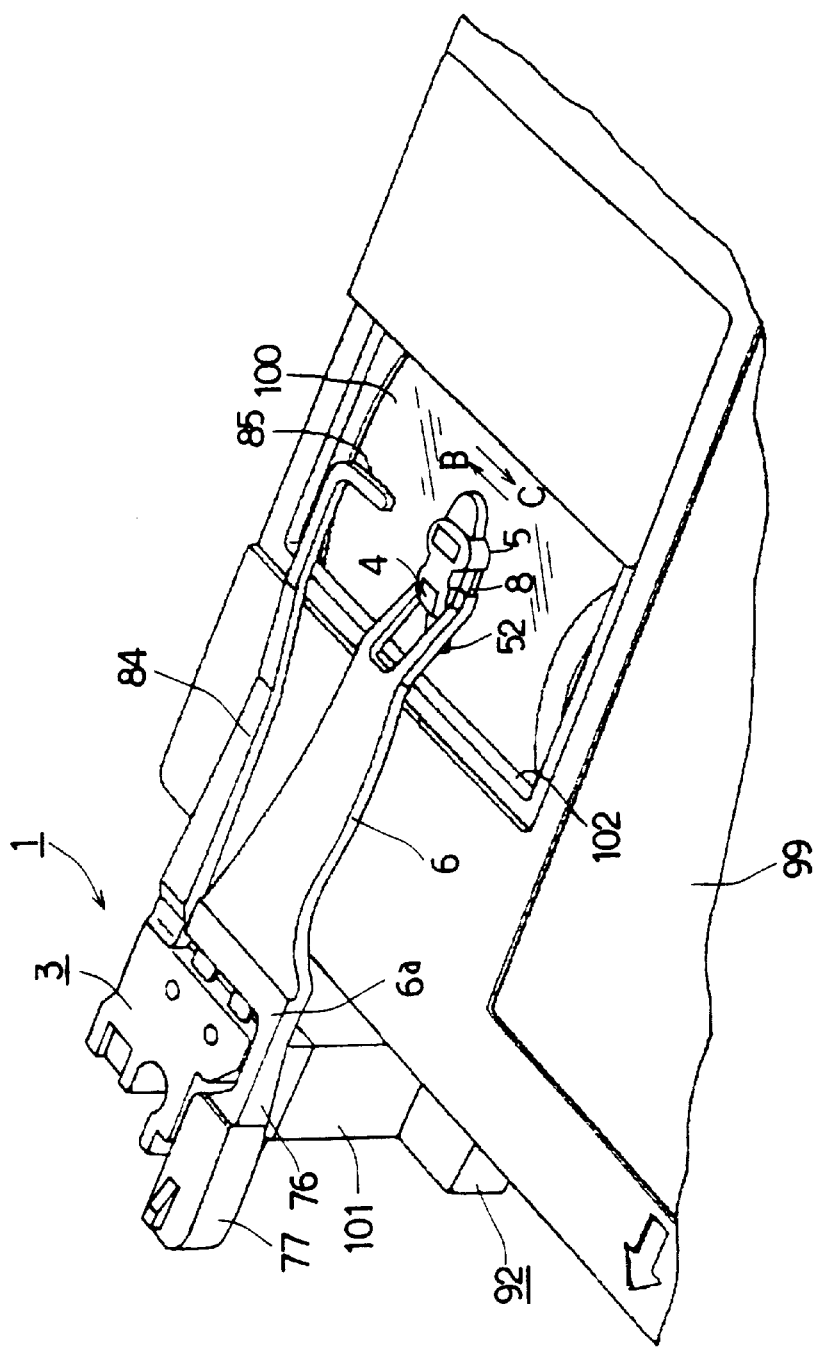
FIG. 14 is a perspective view of a conventional optomagnetic recording/reproducing device.

FIG. 8 is a top view illustrating the assembly of the magnetic head device according to a third embodiment of the present invention. The magnetic head device according to the third embodiment of the present invention differs from a magnetic head device according to the second embodiment of the present invention in that not only the positioning pin 20 mates with the positioning hole 21, but also a fusion pin 22 is mated with a fusion hole 23 and fused, to fasten the protective member 10 to the fastening member 3.

In addition to the positive effects of the first and second embodiments of the present invention, using a fusion pin in the third embodiment of the present invention increases the accuracy and the reliability for fastening of the protective member. Moreover, since a positioning pin and a fusion pin are provided separately, deformation of the positioning pin due to fusion can be avoided, and the protective member can be affixed to the fastening member with great precision.

In a magnetic head device according to the present invention as described above, the position of the position control member and the center of gravity of the moving member are substantially matched, so that a moment on the moving member resulting from a shock can be suppressed and a magnetic head device with excellent shock resistance can be obtained. Moreover, there is no need to provide a weight extending in the longitudinal direction of the moving member, so that a further miniaturization of the device can be realized.

Moreover, a position control member including a position control pin and a position control hole is provided. When a shock is exerted on the magnetic head device, not only a displacement in the moving direction of the moving member, but also in a perpendicular direction thereto can be restricted, because the position control pin is inserted in the position control hole. Thus, a magnetic head device with excellent shock resistance can be obtained. Moreover, by insert-molding the protective member comprising a rotating joint and a position control portion, the positioning precision can be improved and the number of manhours can be decreased.

Providing the fastening member with a fusion pin increases the accuracy and the reliability for fastening of the protective member. Moreover, since a positioning pin and a fusion pin are provided separately, deformation of the positioning pin due to fusion can be avoided, and the protective member can be affixed to the fastening member with great precision.

The invention may be embodied in other specific forms without departing from the spirit or essential characteristics thereof the embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A magnetic head device comprising:
 a system for applying a magnetic field to an information recording medium;

a moving member comprising a slider, which is fastened to said system for applying a magnetic field and slides on or is close to the information recording medium;

an elastically supporting member having a first end, to which the moving member is attached, the elastically supporting member supporting the moving member in a manner that the moving member can move;

a fastening member fastened to a second end of said elastically supporting member;

a position control member for restricting a moving range of said moving member; and a protective member having a first end and a second end, the first end being fastened to said fastening member, and the second end extending toward the side of said slider; wherein at least with respect to a direction from said fastening member towards said slider, the position of said position control member substantially matches the center of gravity of said moving member;

the position control member is formed of (a) a hole or concavity formed at the center of gravity of said moving member and (b) a position control pin formed in said protective member; and said position control pin is inserted into said hole or concavity when said moving member moves towards said protective member.

2. The magnetic head device according to claim 1, wherein said slider, said fastening member, said protective member, and said position control member is formed of plastic; and said elastically supporting member is formed of metal;

said slider, said fastening member, said protective member, said position control member and said elastically supporting member being formed in one piece by insert molding.

3. A magnetic head device comprising:

a system for applying a magnetic field to an information recording medium;

a moving member comprising a slider, which is fastened to said system for applying a magnetic field and slides on or is close to the information recording medium;

an elastically supporting member having a first end, to which the moving member is attached, the elastically supporting member supporting the moving member in a manner that the moving member can move;

a fastening member fastened to a second end of said elastically supporting member;

a position control member for restricting a moving range of said moving member; and a protective member having a first end and a second end, the first end being fastened to said fastening member, and the second end extending toward the side of said slider; wherein said position control member is formed of said protective member and said moving member;

said slider, said fastening member, said protective member, and said position control member is formed of plastic;

said elastically supporting member is formed of metal;

said slider, said fastening member, said protective member, said position control member and said elastically supporting member being formed in one piece by insert molding;

said protective member comprises a rotating joint for rotating said protective member with respect to said fastening member, and a positioning portion for positioning the protective member with respect to the fastening member; and said protective portion is fastened to said fastening member with said positioning portion after the insert molding.

4. The magnetic head device according to claim 3, wherein said protective member is fastened to said fastening member with said positioning portion by rotating said protective member around said rotating joint.

5. The magnetic head device according to claim 4, wherein said protective member is fastened to said fastening member with said positioning portion by inserting a pin into a hole or a concavity.

6. The magnetic head device according to claim 3, wherein said protective member is fastened to said fastening member by gluing.

7. The magnetic head device according to claim 3, wherein said protective member is fastened to said fastening member by heat fusing.

8. The magnetic head device according to claim 7, wherein said protective member is fastened to said fastening member by heat fusing using a fusion pin that is separate from the positioning portion.

9. A magnetic head device comprising:

a system for applying a magnetic field to an information recording medium;

a moving member comprising a slider, which is fastened to said system for applying a magnetic field and slides on or is close to the information recording medium;

an elastically supporting member having a first end, to which the moving member is attached, the elastically supporting member supporting the moving member in a manner that the moving member can move;

a fastening member fastened to a second end of said elastically supporting member; and a position control member for restricting a moving range of said moving member; wherein at least with respect to a direction from said fastening member towards said slider, the position of said position control member substantially matches the center of gravity of said moving member; and said position control member restricts a displacement of said moving member substantially at the center of gravity of said moving member.

* * * * *